(12) United States Patent
Li et al.

(10) Patent No.: US 7,586,567 B2
(45) Date of Patent: Sep. 8, 2009

(54) LIQUID CRYSTAL DISPLAY DEVICE HAVING A SUBSTRATE WITH PATTERNED RECESSES

(75) Inventors: Yuan Li, Shenzhen (CN); Guo-Hua Yu, Shenzhen (CN)

(73) Assignees: Innocom Technology (Shenzhen) Co., Ltd., Shenzhen, Quangdong Province (CN); Innolux Display Corp., Miao-Li County (TW)

( * ) Notice: Subject to any disclaimer, the term of this patent is extended or adjusted under 35 U.S.C. 154(b) by 183 days.

(21) Appl. No.: 11/796,780

(22) Filed: Apr. 30, 2007

(65) Prior Publication Data

US 2007/0252932 A1 Nov. 1, 2007

(30) Foreign Application Priority Data

Apr. 28, 2006 (TW) .............................. 95115385 A

(51) Int. Cl.
G02F 1/1335 (2006.01)
(52) U.S. Cl. ...................................... 349/114; 349/113
(58) Field of Classification Search ................. 349/113, 349/114

See application file for complete search history.

(56) References Cited

U.S. PATENT DOCUMENTS

| | | | |
|---|---|---|---|
| 6,473,220 B1 * | 10/2002 | Clikeman et al. ........... | 359/247 |
| 6,636,286 B1 | 10/2003 | Baek | |
| 6,704,078 B2 | 3/2004 | Ha et al. | |
| 6,950,158 B2 * | 9/2005 | Chang ......................... | 349/114 |
| 7,327,421 B2 * | 2/2008 | Kaneko ....................... | 349/114 |
| 2004/0223100 A1 * | 11/2004 | Kotchick et al. ............ | 349/114 |
| 2005/0140846 A1 * | 6/2005 | Lubart et al. ................. | 349/62 |
| 2006/0158586 A1 * | 7/2006 | Bruinink et al. ............. | 349/114 |
| 2006/0187385 A1 * | 8/2006 | Liao et al. .................... | 349/114 |
| 2006/0197896 A1 * | 9/2006 | Nakano et al. .............. | 349/114 |
| 2007/0064193 A1 * | 3/2007 | Kurasawa .................... | 349/155 |

FOREIGN PATENT DOCUMENTS

TW 556025 10/2003

* cited by examiner

*Primary Examiner*—Michelle R Connelly Cushwa
(74) *Attorney, Agent, or Firm*—Wei Te Chung

(57) ABSTRACT

An exemplary liquid crystal display device (1) includes: a first substrate (11); a second substrate (12) opposite to the first substrate, the second substrate including a bottom surface having a plurality of recesses (125) defined thereat, a plurality of reflection layers (126) filled in the recesses; a liquid crystal layer (14) between the first and second substrates; a plurality of pixel regions (13) adjacent each other and each spanning through the first substrate, the liquid crystal layer, and the second substrate, each pixel region including a reflection region (133) and a transmission region (134); and a backlight module (17) disposed adjacent to the second substrate. In each pixel region, the reflection regions correspond to portions of the bottom surface of the second substrate having the reflection layers. The transmission regions correspond to portions of the bottom surface of the second substrate that do not have the reflection layers.

9 Claims, 2 Drawing Sheets

LIQUID CRYSTAL DISPLAY DEVICE HAVING A SUBSTRATE WITH PATTERNED RECESSES

FIELD OF THE INVENTION

The present invention relates to liquid crystal display (LCD) devices, and more particularly to a reflection/transmission type LCD device capable of providing a display both in a reflection mode and a transmission mode.

GENERAL BACKGROUND

Because LCD devices have the advantages of portability, low power consumption, and low radiation, they have been widely used in various portable information products such as notebooks, personal digital assistants (PDAs), video cameras, and the like. Furthermore, LCD devices are considered by many to have the potential to completely replace CRT (cathode ray tube) monitors and televisions.

Among LCD products, there have been the following two types of LCD devices commercially available: a reflection type LCD device utilizing ambient light and a transmission type LCD device utilizing backlight. With a reflection type LCD device, a display becomes less visible in a poorly lit environment. In contrast, a display of a transmission type LCD device appears hazy in strong ambient light (e.g., outdoor sunlight). Thus researchers sought to provide an LCD device capable of functioning in both modes so as to yield a satisfactory display in any environment. In due course, a transflective (reflection/transmission) type LCD device was developed.

A typical transflective LCD includes a multiplicity of pixel regions. One or more reflective electrodes are provided in each of the pixel regions. Thus, a reflective region is defined in each pixel region. The reflective electrodes are made from material with a high reflective ratio, such as silver (Ag), aluminum (Al), or aluminum alloy. Further, the reflective electrodes are usually manufactured via a photolithography process. The structure of the transflective LCD is intricate, and the process of manufacturing the transflective LCD is somewhat complicated.

SUMMARY

An exemplary liquid crystal display device includes: a first substrate; a second substrate opposite to the first substrate, the second substrate including a bottom surface having a plurality of recesses defined thereat, and a plurality of reflection layers filled in the recesses; a liquid crystal layer between the first and second substrates; a plurality of pixel regions adjacent each other and each spanning through the first substrate, the liquid crystal layer, and the second substrate, each pixel region including a reflection region and a transmission region; and a backlight module disposed adjacent to the second substrate. In each pixel region, the reflection regions correspond to portions of the bottom surface of the second substrate having the reflection layers. The transmission regions correspond to portions of the bottom surface of the second substrate that do not have the reflection layer.

Another exemplary liquid crystal display device includes a first substrate; a second substrate opposite to the first substrate, the second substrate includes a bottom surface having a plurality of recesses and reflection material filling with the recesses; a liquid crystal layer between the first and second substrates; and a backlight module disposed adjacent to the second substrate. The liquid crystal display includes a plurality of reflection regions corresponding to portions of the second substrate covered by the reflection material and a plurality of transmission region corresponding to portions of the second substrate without the reflection material.

Other advantages and novel features will become more apparent from the following detailed description when taken in conjunction with the accompanying drawings. In the drawings, all the views are schematic.

DETAILED DESCRIPTION OF PREFERRED EMBODIMENTS

Figure 1:
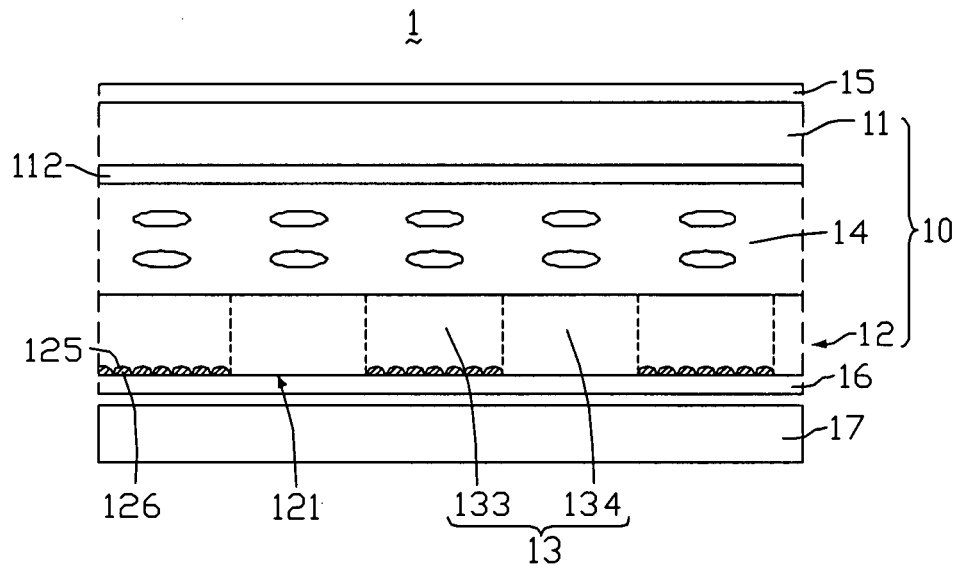
FIG. 1 is a side cross-sectional view of part of an LCD device according to a first embodiment of the present invention.
Figure 2:
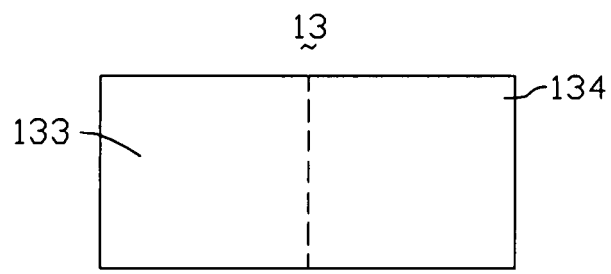
FIG. 2 is a plan view of one of pixels region of the LCD device of FIG. 1, showing a distribution of a reflection region and a transmission region of the pixel region.

FIG. 1 is a side cross-sectional view of part of an LCD device according to a first embodiment of the present invention. The LCD device 1 includes a liquid crystal panel 10 and a backlight module 17. The liquid crystal panel 10 includes a first substrate 11, a second substrate 12 spaced apart from and opposite to the first substrate 11, and a liquid crystal layer 14 between the first substrate 11 and the second substrate 12. The backlight module 17 is disposed under the second substrate 12, for illuminating the liquid crystal panel 10.

The second substrate 12 includes a plurality of gate lines (not labeled) that are parallel to each other and that each extend along a first direction, and a plurality of source bus lines (not labeled) that are parallel to each other and that each extend along a second direction orthogonal to the first direction. A grid formed by the crossing gate lines and source bus lines defines a multiplicity of pixel regions 13. Each pixel region 13 can be considered to span a full thickness of the liquid crystal panel 10. That is, each pixel region 13 can be considered to occupy a vertical segment of the liquid crystal panel 10 as shown in FIG. 1. However, only the part of each pixel region 13 in the second substrate 12 is shown in FIG. 1, with broken lines.

The first substrate 11 includes a color filter 112 disposed at an inner side thereof. The color filter 112 is adjacent to the liquid crystal layer 14. The second substrate 12 includes a bottom surface 121 facing toward the backlight module 17. The bottom surface 121 defines a plurality of groups of patterned recesses 125 thereat. The groups of patterned recesses 125 are evenly spaced apart. In the illustrated embodiment, a distance separating adjacent groups is equal to a width of each group. In each group, the recesses 125 are continuously formed, and each recess 125 has a semicircular shape. For example, each recess 125 may be substantially hemispherical, or may be an elongate groove defining a semicircular cross-section. A reflection layer 126 is filled in each group of the patterned recesses 125. The reflection layer 126 may be made of material having a high reflective ratio, such as silver (Ag), aluminum (Al), aluminum alloy, or a like material.

In each pixel region 13, a subregion thereof corresponds to a portion of the bottom surface 121 of the second substrate 12 covered by a respective one of the reflection layers 126. This subregion is defined as a reflection region 133. Another subregion of each pixel region 13 corresponds to a respective portion of the bottom surface 121 of the second substrate 12 that does not have a reflection layer 126. This other subregion is defined as a transmission region 134. In FIG. 1, only the part of each reflection region 133 in the second substrate 12 is shown, with broken lines. Similarly, only the part of each transmission region 134 in the second substrate 12 is shown, with broken lines.

The LCD device 1 further includes a first polarizer 15 disposed on an outer surface of the first substrate 11, and a second polarizer 16 disposed on an outer surface of the second substrate 12. That is, the second polarizer 16 is adjacent to the backlight module 17.

Figure 3:
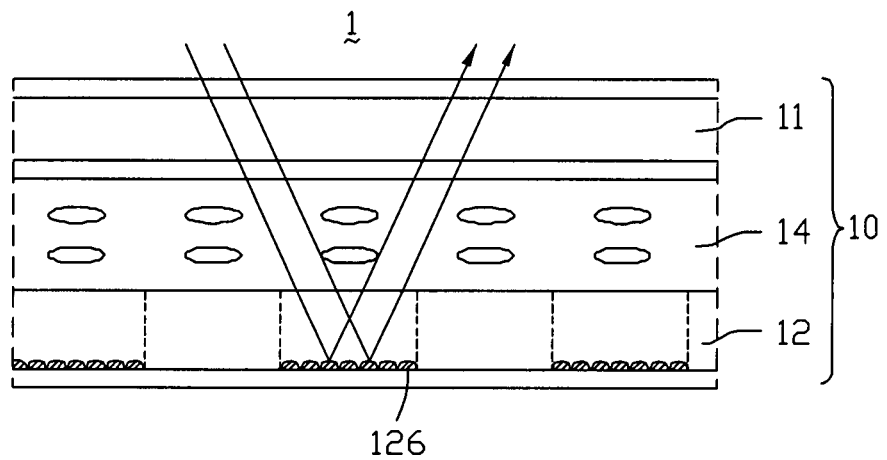
FIG. 3 is similar to FIG. 1, but omitting a backlight module thereof, and showing essential optical paths when the LCD device operates in a reflection mode.

In use, when ambient light is strong enough, the LCD device 1 operates used in a reflection mode. Referring to FIG. 3, ambient light beams above the liquid crystal panel 10 pass through the first polarizer 15, the first substrate 11, the color filter 112, the liquid crystal layer 14, and the second substrate 12, and irradiate the reflection layer 126. The ambient light beams are reflected by the reflection layer 126, and pass back through the second substrate 12, the liquid crystal layer 14, the color filter 112, the first substrate 11, and the first polarizer 15 to display images.

When the ambient light is poor, the LCD device 1 operates in a transmission mode. Light beams emitted by the backlight module 17 pass through the portions of the bottom surface 121 of the second substrate 12 that do not have a reflection layer 126, the second substrate 12, the liquid crystal layer 14, the color filter 112, the first substrate 11, and the first polarizer 15 to display images.

When the LCD device 1 is used in the reflection mode, ambient light beams can be utilized. This allows the backlight module 17 to be switched off, thereby saving on power consumption. Visibility can also be improved, particularly in the case where the ambient light is strong. Furthermore, the LCD device 1 is able to provide both transmission mode operation and reflection mode operation by reason of the substrate 12 having the patterned recesses 125 filled with the reflection layers 126. Unlike in a conventional LCD device, there is no need to configure electrodes in each of pixel regions to be reflective. Therefore the structure of the LCD device 1 is relatively simple, and the process of manufacturing the LCD device 1 can be relatively uncomplicated.

Figure 4:
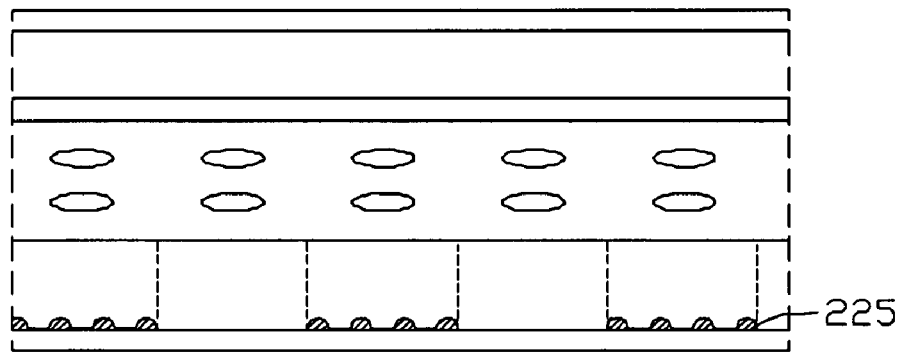
FIG. 4 is a side cross-sectional view of part of an LCD device according to a second embodiment of the present invention.

FIG. 4 is a side, cross-sectional view of part of an LCD device according to a second embodiment of the present invention. The LCD device 2 has a structure similar to the LCD device 1 of the first embodiment. A plurality of groups of recesses 225 are evenly spaced apart. In each group, the recesses 225 are evenly spaced apart, but connected by shallow gaps (not labeled). The gaps can for example be shallow, somewhat diamond-shaped spaces (e.g. when the recesses 225 are substantially hemispherical); or shallow elongate spaces (e.g. when the recesses 225 are elongate grooves). In the illustrated embodiment, a width of each recesses 225 is equal to a width of each shallow gap. A reflection layer (not labeled) is filled in each group of the recesses 225, including in the shallow gaps.

Figure 5:
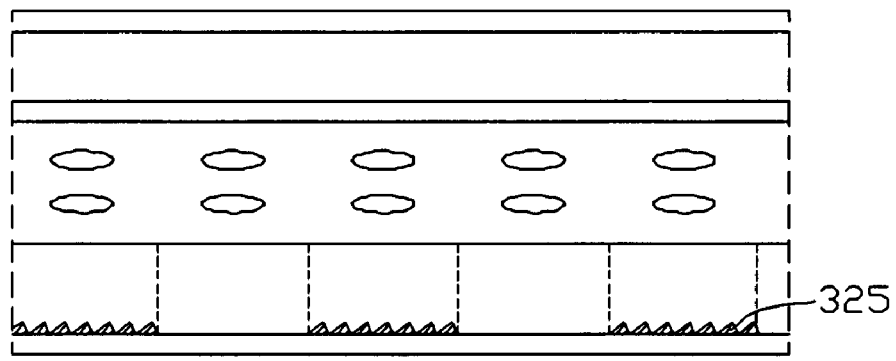
FIG. 5 is a side cross-sectional view of part of an LCD device according to a third embodiment of the present invention.

FIG. 5 is a schematic, side cross-sectional view of part of an LCD device according to a third embodiment of the present invention. The LCD device 3 has a structure similar to the LCD device 1 of the first embodiment. However, each patterned recess 325 in the LCD device 3 defines a scalene triangular cross-section. In the illustrated embodiment, the orientations of the triangular cross-sections of all the recesses 325 are uniform. A reflection layer (not labeled) is filled in each group of the recesses 325.

Figure 6:
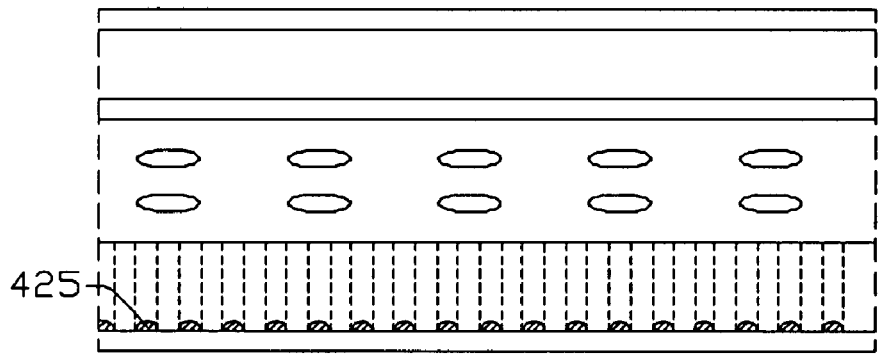
FIG. 6 is a side cross-sectional view of part of an LCD device according to a fourth embodiment of the present invention.

FIG. 6 is a schematic, side cross-sectional view of part of an LCD device according to a fourth embodiment of the present invention. The LCD device 4 has a structure similar to the LCD device 1 of the first embodiment. However, a plurality of patterned recesses 425 is evenly spaced apart throughout an entirety of a bottom surface (not labeled) of the LCD device 4. In the illustrated embodiment, a distance separating adjacent recesses 425 is substantially equal to a width of each recess 425. A reflection layer (not labeled) is filled in each recess 425.

Various modifications and alterations are possible in addition to the above-described embodiments. For example, the shapes and sizes of the patterned recesses can be varied as desired.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display device, comprising:
   a first substrate;
   a second substrate opposite to the first substrate, the second substrate comprising a bottom surface having a plurality of recesses arranged in a plurality of groups and a plurality of shallow gaps defined thereat, a plurality of reflection layers filled in the recesses and the shallow gaps, the groups of the recesses being evenly spaced apart from each other with a distance separating adjacent groups of recesses being equal to a width of each group of recesses, the recesses in each group of recesses being evenly spaced apart from each other, but connected with one another by the shallow gaps, a width of each recess being equal to a width of each shallow gap;
   a liquid crystal layer between the first and second substrates;
   a plurality of pixel regions adjacent each other and each spanning through the first substrate, the liquid crystal layer, and the second substrate, each pixel region comprising a reflection region and a transmission region; and
   a backlight module disposed adjacent to the second substrate;
   Wherein the reflection regions correspond to portions of the bottom surface of the second substrate having the reflection layers, and the transmission regions correspond to portions of the bottom surface of the second substrate that do not have the reflection layers.

2. The liquid crystal display device as claimed in claim 1, wherein each recess defines a shape selected from the group consisting of a hemisphere and a groove defining a semicircular cross-section.

3. The liquid crystal display device as claimed in claim 1, wherein each recess defines a scalene triangular cross-section.

4. The liquid crystal display device as claimed in claim 1, wherein the reflection layers are made of material selected from the group consisting of silver (Ag), aluminum (Al), and aluminum alloy.

5. The liquid crystal display device as claimed in claim 1, wherein each shallow gap defines a shape selected from the group consisting of a diamond-shaped space and an elongate space.

6. A liquid crystal display device, comprising:
a first substrate;
a second substrate opposite to the first substrate, the second substrate comprising a bottom surface and defining a plurality of recesses arranged in a plurality of groups and a plurality of shallow gaps at the bottom surface, reflection material being filled in at least some of the recesses and the shallow gaps, the groups of the recesses being evenly spaced apart from each other with a distance separating adjacent groups of recesses being equal to a width of each group of recesses, the recesses in each group of recesses being evenly spaced apart from each other, but connected with one another by the shallow gaps, a width of each recess being equal to a width of each shallow gap;
a liquid crystal layer between the first and second substrates;
a backlight module disposed adjacent a bottom of the second substrate;
a plurality of reflection regions corresponding to portions of the bottom surface of the second substrate covered by the reflection material; and
a plurality of transmission regions corresponding to portions of the bottom surface of the second substrate without the reflection material.

7. The liquid crystal display device as claimed in claim 6, wherein each recess defines a shape selected from the group consisting of a hemisphere and a groove defining a semicircular cross-section.

8. The liquid crystal display device as claimed in claim 6, wherein each recess defines a scalene triangular cross-section.

9. The liquid crystal display device as claimed in claim 6, wherein the reflection layers are made of material selected from the group consisting of silver (Ag), aluminum (Al), and aluminum alloy.

* * * * *